United States Patent
Ishibashi et al.

(10) Patent No.: US 9,864,197 B2
(45) Date of Patent: Jan. 9, 2018

(54) DISPLAY DEVICE

(71) Applicant: NIPPON SEIKI CO., LTD., Niigata (JP)

(72) Inventors: Ryoichi Ishibashi, Niigata (JP); Satoshi Kobayashi, Niigata (JP); Norihiko Ushida, Niigata (JP); Yoshiko Adachi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/303,361

(22) PCT Filed: Apr. 15, 2015

(86) PCT No.: PCT/JP2015/061547
§ 371 (c)(1),
(2) Date: Oct. 11, 2016

(87) PCT Pub. No.: WO2015/163204
PCT Pub. Date: Oct. 29, 2015

(65) Prior Publication Data
US 2017/0038587 A1   Feb. 9, 2017

(30) Foreign Application Priority Data
Apr. 23, 2014  (JP) .................. 2014-089189

(51) Int. Cl.
G02B 26/08   (2006.01)
G02B 27/01   (2006.01)
(Continued)

(52) U.S. Cl.
CPC .......... *G02B 27/0149* (2013.01); *B60K 35/00* (2013.01); *B60K 37/02* (2013.01);
(Continued)

(58) Field of Classification Search
CPC  G02B 27/0149; G02B 27/0179; G02B 27/01; G02B 27/14; G02B 7/182;
(Continued)

(56) References Cited

U.S. PATENT DOCUMENTS

| | | | |
|---|---|---|---|
| 5,032,781 A | 7/1991 | Kronenberg | |
| 2011/0193508 A1 | 8/2011 | Oomori | |
| 2013/0201541 A1 | 8/2013 | Sasaki et al. | |

FOREIGN PATENT DOCUMENTS

| | | |
|---|---|---|
| EP | 1760875 A1 | 3/2007 |
| JP | S62-230397 A | 10/1987 |

(Continued)

OTHER PUBLICATIONS

Search Report issued in corresponding International Application No. PCT/JP2015/061547, dated Jun. 30, 2015.

*Primary Examiner* — James Phan
(74) *Attorney, Agent, or Firm* — McDermott Will & Emery LLP (57) ABSTRACT

A display device includes: a stepping motor; a concave mirror that moves in accordance with the operation of the stepping motor, the concave mirror reflecting display light emitted from a display unit toward the windshield; a lever part that moves together with the concave mirror; a drive unit for driving the stepping motor by a microstep drive system; a control unit for controlling the movement of the concave mirror by controlling the drive unit; and a stopper unit provided within the range of movement of the lever part. The drive unit is configured to detect the counter-electromotive force generated by the stepping motor when the lever part comes into contact with the stopper unit. The control unit determines the reference position when the movement of the concave mirror is controlled in accordance with the counter-electromotive force detected by the drive unit.

7 Claims, 8 Drawing Sheets

(51) Int. Cl.
*B60K 35/00* (2006.01)
*H02P 8/00* (2006.01)
*B60K 37/02* (2006.01)
*G02B 7/182* (2006.01)
*G02B 7/198* (2006.01)
*G02B 27/14* (2006.01)
*G09G 5/32* (2006.01)
*H02P 8/22* (2006.01)
*H02P 8/24* (2006.01)

(52) U.S. Cl.
CPC ............. *G02B 7/182* (2013.01); *G02B 7/198* (2013.01); *G02B 26/08* (2013.01); *G02B 26/0816* (2013.01); *G02B 27/01* (2013.01); *G02B 27/0179* (2013.01); *G02B 27/14* (2013.01); *G09G 5/32* (2013.01); *H02P 8/00* (2013.01); *H02P 8/22* (2013.01); *H02P 8/24* (2013.01); *B60K 2350/2065* (2013.01); *B60K 2350/352* (2013.01); *G02B 2027/0154* (2013.01); *G02B 2027/0159* (2013.01); *G02B 2027/0161* (2013.01); *G02B 2027/0163* (2013.01); *G02B 2027/0181* (2013.01); *G02B 2027/0185* (2013.01); *G09G 2300/04* (2013.01)

(58) Field of Classification Search
CPC .... G02B 7/198; G02B 26/08; G02B 26/0816; G02B 2027/0154; G02B 2027/0159; G02B 2027/0161; G02B 2027/0163; G02B 2027/0181; G02B 2027/0185; B60K 2350/2065; B60K 2350/352; G09G 5/32; G09G 2300/04; H02P 8/00; H02P 8/22; H02P 8/24
USPC ......... 359/196.1–199.1, 199.3, 200.1, 200.7, 359/212.1–214.1, 221.2–221.3, 359/223.1–226.2
See application file for complete search history.

(56) References Cited

FOREIGN PATENT DOCUMENTS

| | | |
|---|---|---|
| JP | 2004-090888 A | 3/2004 |
| JP | 2011-178380 | 9/2011 |
| JP | 2013-160905 | 8/2013 |
| JP | 2013-164482 A | 8/2013 |
| WO | 2015/033549 A1 | 3/2015 |

DISPLAY DEVICE

CROSS REFERENCE

This application is the U.S. National Phase under 35 U.S.C. §371 of International Application No. PCT/JP2015/061547, filed on Apr. 15, 2015, which claims the benefit of Japanese Application No. 2014-089189, filed on Apr. 23, 2014, the entire contents of each are hereby incorporated by reference.

TECHNICAL FIELD

The present invention relates to a display device.

BACKGROUND ART

A conventional display device is, for example, ahead-up display device disclosed in PTL 1. This device projects display light from a display unit onto a windshield of a vehicle, thereby displaying a virtual image of an image formed by the display light. This device is configured so that the display light from the display unit is reflected by a concave mirror to be directed toward the windshield and is also configured so that a display position of the virtual image can be adjusted by rotationally moving the concave mirror by using a stepping motor.

In the case where the stepping motor is used as described above, it is necessary to perform return-to-home operation for returning the stepping motor to a mechanical reference position at the time of, for example, starting the device and then determine a home position. In the device of PTL 1, a home position (reference position) of the concave mirror is determined by bringing the concave mirror into contact with a mechanical switch (limit switch).

CITATION LIST

Patent Literature

PTL 1: JP-A-2013-164482

SUMMARY OF INVENTION

Technical Problem(s)

A system can be simplified if the mechanical switch for determining a home position of a reflector such as a concave mirror can be removed. In the case where the display device is mounted on, for example, a vehicle, an operating temperature range is wide (for example, −40 to +85° C.). A mechanical switch having high detection accuracy even within such a wide temperature range is expensive, which results in increase in costs.

The invention has been made in view of the above circumstances, and an object of the invention is to provide a display device capable of determining a home position (reference position) of a reflector moved by a stepping motor without using a mechanical switch.

Solution to Problem(s)

In order to achieve the above object, a display device according to the invention is a display device for projecting display light emitted from a display unit onto a light transmitting member to display a virtual image of an image formed by the display light, including:

a stepping motor;

a reflector for reflecting the display light emitted by the display unit toward the light transmitting member, the reflector moving in accordance with operation of the stepping motor;

a moving part moving together with the reflector;

drive means for driving the stepping motor with a microstep drive system;

control means for controlling the drive means to control movement of the reflector; and a stopper unit provided within a range of movement of the moving part, in which:

the drive means has a function of detecting counter-electromotive power that is generated in the stepping motor when the moving part abuts against the stopper unit; and when the drive means detects the counter-electromotive power, the control means determines a reference position for controlling movement of the reflector.

Advantageous Effects of Invention

According to the invention, it is possible to determine a home position (reference position) of a reflector moved by a stepping motor without using a mechanical switch.

BRIEF DESCRIPTION OF DRAWINGS

FIG. 5($a$) shows waveforms of currents flowing through an A phase and a B phase of a stepping motor. FIG. 5($b$) is obtained by enlarging a part of the waveforms of the currents shown in FIG. 5($a$), which shows a difference between a waveform obtained while the stepping motor is being operated and a waveform obtained while the stepping motor is being stopped.

FIGS. 7($a$) and 7($b$) are explanatory views of a stopper unit according to Modification Example 1.

DESCRIPTION OF EMBODIMENTS

A display device according to an embodiment of the invention will be described with reference to the drawings.

Figure 1:
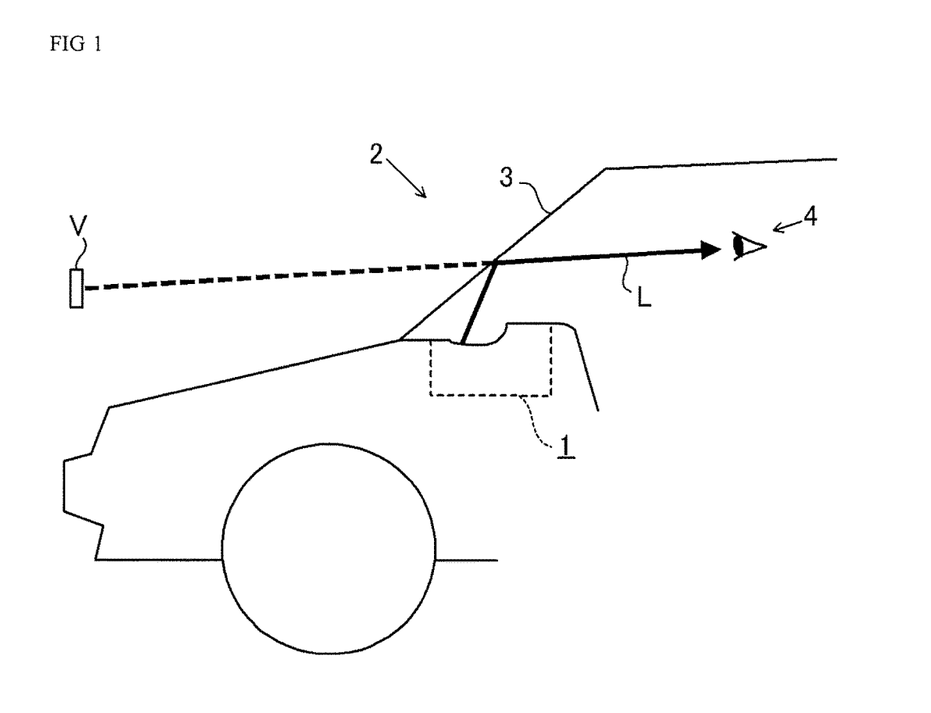
FIG. 1 illustrates an aspect in which a display device according to an embodiment of the invention is mounted on a vehicle.

As illustrated in FIG. 1, a display device 1 according to this embodiment is mounted on a vehicle 2. The display device 1 is configured as a head-up display (HUD) for projecting display light L forming an image onto a windshield 3 of the vehicle 2, thereby displaying a virtual image V of the image ahead of the windshield 3. With this, a user 4 who is mainly a driver of the vehicle 2 can visually recognize the virtual image V overlapped on a landscape. The display device 1 is placed in, for example, an instrument panel of the vehicle 2.

Figure 2:
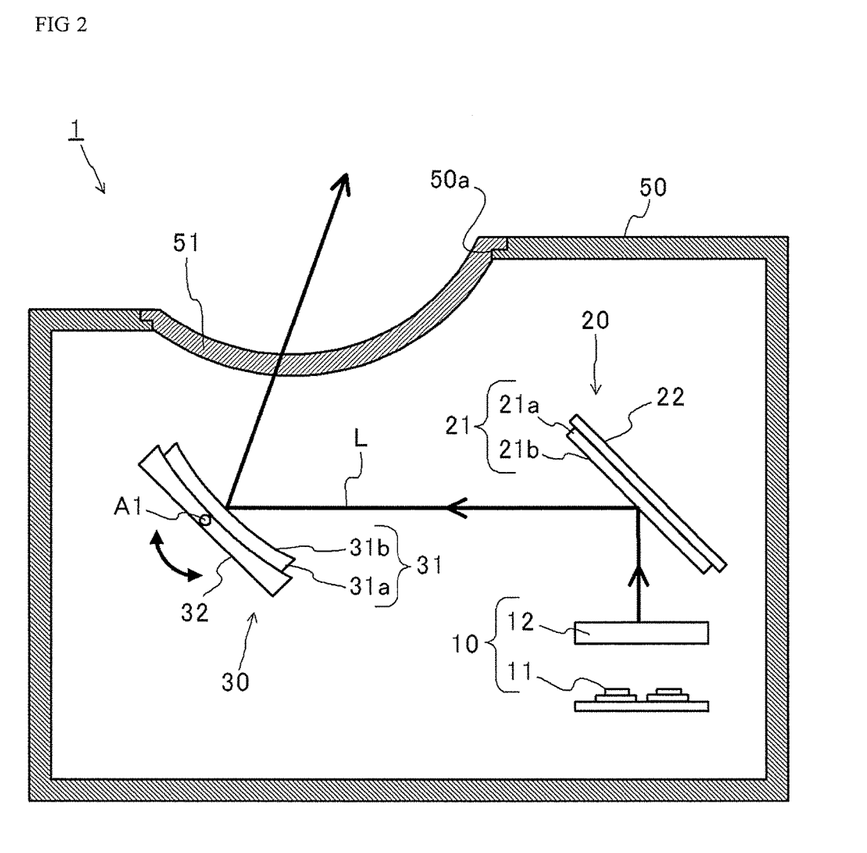
FIG. 2 is a schematic configuration diagram of a display device according to an embodiment of the invention.

As illustrated in FIG. 2, the display device 1 includes a display unit 10, a first reflector 20, a second reflector 30, a rotary drive mechanism 40, and a housing 50.

The display unit 10 emits the display light L and includes a light source 11 and a liquid crystal panel 12.

The light source 11 illuminates the liquid crystal panel 12 from a back surface thereof. The light source 11 includes LEDs (Light Emitting Diodes) mounted on a circuit board 11a (printed circuit board) on which various kinds of wiring are formed. The light source 11 is connected to a control unit 100 described below via the circuit board 11a.

The liquid crystal panel 12 is, for example, a TFT (Thin Film Transistor) liquid crystal panel. The liquid crystal panel 12 changes a state of each of a plurality of pixels to a transmission/non-transmission state under the control of the control unit 100 and a GDC (Graphics Display Controller) 90 described below. The liquid crystal panel 12 displays a predetermined image by transmitting light from the light source 11 through the pixels that are in the transmission state. In this way, light (display light L) forming the image is emitted through the liquid crystal panel 12. The liquid crystal panel 12 displays, for example, an image for informing the user 4 of information on the vehicle (hereinafter, vehicle information) such as operating speed (vehicle speed) and engine speed of the vehicle 2.

The first reflector 20 reflects the display light L from the display unit 10 toward the second reflector 30. The first reflector 20 includes a cold mirror 21 and a holding member 22 holding the cold mirror 21.

The cold mirror 21 includes a substrate 21a and a reflective layer 21b formed on one surface (surface facing the second reflector 30) of the substrate 21a. The substrate 21a is made of glass, resin, or the like to have a substantially rectangular shape. The reflective layer 21b is made of multilayer interference films having different film thicknesses and is formed by, for example, depositing metal such as aluminum on the substrate 21a. The cold mirror 21 is configured so that, for example, light in a visible wavelength range (450 nm to 750 nm) including a light emitting wavelength range of the display unit 10 is reflected by the reflective layer 21b at high reflectance (for example, 80% or more). The cold mirror 21 is also configured so that light beyond the visible wavelength range is reflected at low reflectance. Specifically, the cold mirror 21 is configured so that the light beyond the visible wavelength range, in particular, light in an infrared wavelength range (infrared rays or heat rays of sunlight) is reflected by the reflective layer 21b at low reflectance (for example, 15% or less). Note that light that is not reflected by the reflective layer 21b is transmitted through the cold mirror 21.

The holding member 22 is made of, for example, a black synthetic resin material and is fixed to the housing 50.

The second reflector 30 reflects the display light L from the first reflector 20 toward the windshield 3. The second reflector 30 includes a concave mirror 31 and a holding member 32 holding the concave mirror 31.

The concave mirror 31 includes a substrate 31a having a concave surface and a reflective layer 31b formed on the concave surface of the substrate 31a. The substrate 31a is made of, for example, resin such as polycarbonate. The reflective layer 31b is formed by, for example, depositing metal such as aluminum on the substrate 31a. The concave mirror 31 reflects the display light L toward the windshield 3 while enlarging the display light L that has been emitted from the display unit 10 and has been reflected by the first reflector 20. With this, the size of the virtual image V to be visually recognized is the enlarged size of the image displayed on the display unit 10.

The holding member 32 is made of synthetic resin (for example, ABS (Acrylonitrile Butadiene Styrene) resin) and holds the concave mirror 31. For example, the concave mirror 31 is bonded to the holding member 32 by using a double-sided adhesive tape to be held by the holding member 32. The holding member 32 includes a shaft A1 pivotally supported by a bearing part (not illustrated) provided in the housing 50. The holding member 32 and the concave mirror 31 held by the holding member 32 are configured to be rotatable about the shaft A1 in the housing 50. The shaft A1 extends in a direction normal to the sheet of FIG. 2.

Figure 3:
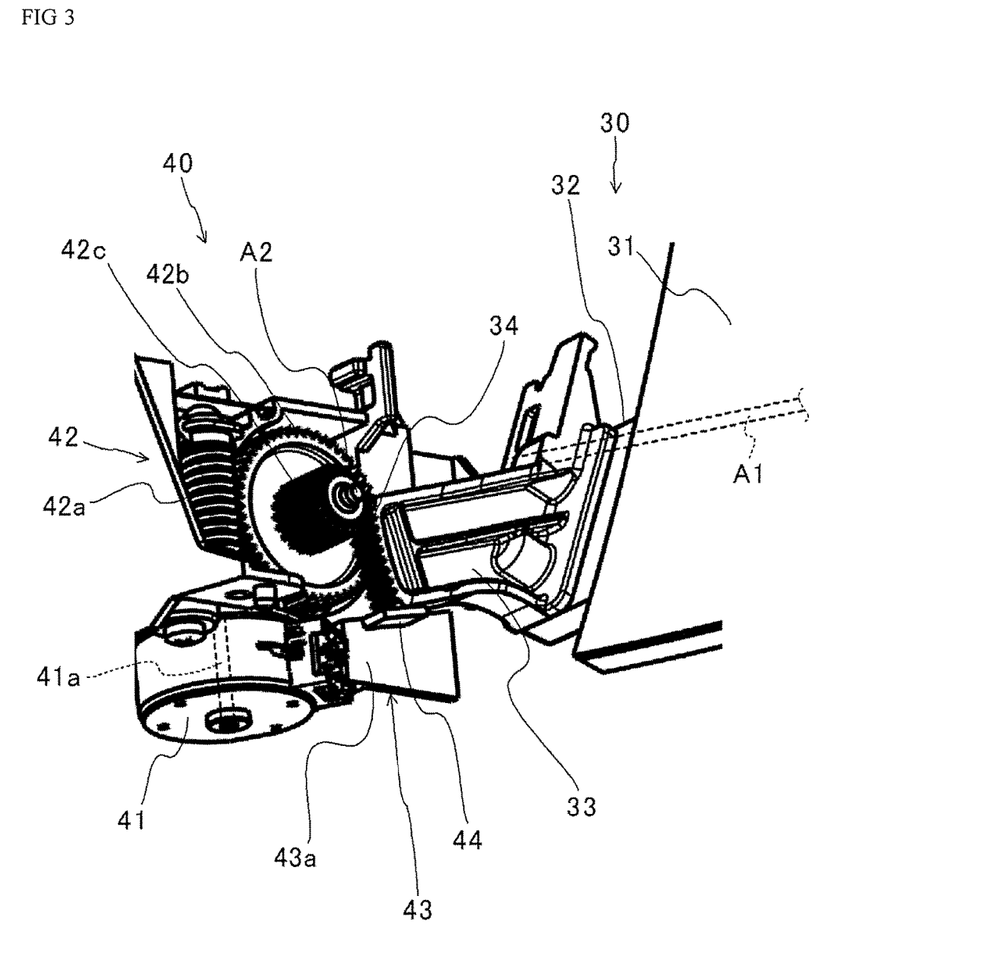
FIG. 3 is a perspective view mainly illustrating a rotary drive mechanism according to an embodiment of the invention.

As illustrated in FIG. 3, the holding member 32 protrudes beyond one end of the concave mirror 31 and includes a lever part 33 projected in a direction in which the concave surface of the concave mirror 31 faces. A gear part 34 engaged with a gear mechanism 42 described below is formed in a tip end portion of the lever part 33.

The rotary drive mechanism 40 rotationally drives the second reflector 30 and includes a stepping motor 41, the gear mechanism 42, a container 43, and a stopper unit 44.

The stepping motor 41 is driven by a drive unit 110 described below with a microstep drive system. The stepping motor 41 is configured as, for example, a PM type (Permanent Magnet type) stepping motor.

Figure 4:
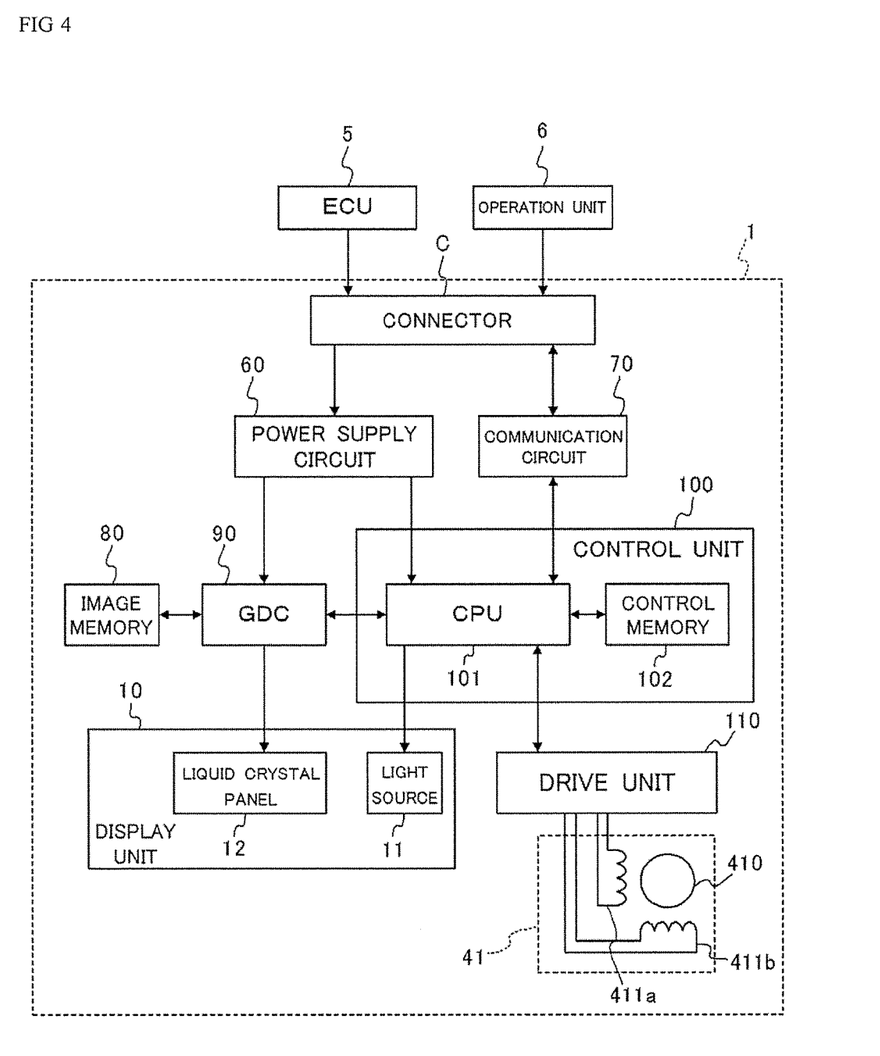
FIG. 4 is a block diagram showing an electrical configuration of a display device according to an embodiment of the invention.

As illustrated in FIG. 4, the stepping motor 41 includes a rotor 410 and excitation coils 411a and 411b wound around a stator (not illustrated).

The rotor 410 includes a permanent magnet magnetized to the N-pole and the S-pole in a circumferential direction. A rotating shaft 41a of the stepping motor 41 rotates in accordance with rotation of the rotor 410. The stator has a plurality of iron teeth positioned at regular intervals on an inner circumferential surface facing the rotor 410. The excitation coil 411a and the excitation coil 411b have a phase difference of 90° and are wound around the iron teeth of the stator.

The drive unit 110 described below causes a current to flow to excite the excitation coils 411a and 411b of the stepping motor 41, and the excitation coils 411a and 411b are changed to both the N-pole and the S-pole. Meanwhile, in the case where the excitation coils 411a and 411b are not excited because no current flows therethrough, a holding torque is generated. In this case, the N-pole and the S-pole of the rotor 410 are attracted to the nearest iron tooth and become stable in a state in which the N-pole and the S-pole face the iron tooth. In other words, a state in which the N-pole and the S-pole of the rotor 410 face the iron tooth of the stator is a stable position (hereinafter, referred to as a stable point) of the rotor.

The gear mechanism 42 includes a plurality of gears, and rotational power of the stepping motor 41 is transmitted to the second reflector 30. Specifically, the gear mechanism 42 includes a motor gear (not illustrated) attached to the rotating shaft 41a of the stepping motor 41, a worm gear 42a engaged with the motor gear, a helical gear 42b engaged with the worm gear 42a, and a spur gear 42c integrally formed with the helical gear 42b. The spur gear 42c is engaged with the gear part 34 formed on the lever part 33 of the holding member 32. Each gear is attached to a shaft provided in the container 43 and can be rotatable about a predetermined shaft. In particular, the helical gear 42b and the spur gear 42c can rotate about a shaft A2 provided in the container 43.

The gear mechanism 42 configured as described above transmits power of the rotating shaft 41a of the stepping motor 41 to the motor gear, then to the worm gear 42a, and then to the helical gear 42b, thereby rotating the spur gear 42c about the shaft A2. Because the gear part 34 is engaged with the spur gear 42c, a position of the lever part 33 is moved in accordance with a rotational motion of the spur gear 42c and the holding member 32 rotates about the shaft A1 in accordance with this movement. In other words, the second reflector 30 including the concave mirror 31 rotates about the shaft A1.

With this configuration, the rotary drive mechanism 40 rotationally drives the second reflector 30. The rotary drive mechanism 40 rotates the second reflector 30 about the rotating shaft A1 at a predetermined rotation angle under the control of the control unit 100 described below.

The container 43 is made of resin and receives the stepping motor 41 and the gear mechanism 42. The container 43 has a flat surface part 43a facing in a direction in which the shaft A1 of the second reflector 30 extends.

The stopper unit 44 is a plate-like part projected from the flat surface part 43a of the container 43 toward the second reflector 30 in a direction in which the shaft A1 extends. In other words, the stopper unit 44 is integrally formed with the container 43. When the second reflector 30 continuously rotates counterclockwise in FIG. 3, the stopper unit 44 is brought into contact with the lever part 33. In this way, the stopper unit 44 regulates a range of rotational movement of the second reflector 30.

In this embodiment, as described below, the control unit 100 determines a home position of the second reflector 30 by bringing the lever part 33 of the second reflector 30 into contact with the stopper unit 44. In other words, the stopper unit 44 is provided for determining the home position of the second reflector 30.

Note that, in the display device 1 in this embodiment, the lever part 33 provided to be apart from the concave mirror 31 is brought into contact with the stopper unit 44 as described above, and therefore it is possible to suppress distortion of the concave mirror 31 which may be generated by collision between the two.

The rotary drive mechanism 40 in this embodiment is configured so that, when the rotating shaft 41a of the stepping motor 41 rotates in a CCW (CounterClockWise) direction, the lever part 33 rotates in a direction in which the lever part 33 moves away from the stopper unit 44. On the contrary, in the case where the rotating shaft 41a of the stepping motor 41 rotates in a CW (Clockwise) direction, the lever part 33 approaches the stopper unit 44.

Referring back to FIG. 2, the housing 50 receives the display unit 10, the first reflector 20, the second reflector 30, and the rotary drive mechanism 40 at appropriate positions for realizing the above functions.

The housing 50 has a box shape and is made of synthetic resin or metal to have a light shielding property. The housing 50 has an opening part 50a to secure an optical path of the display light L. A light transmitting cover 51 is attached to the housing 50 so as to close the opening part 50a. The light transmitting cover 51 is made of light transmitting resin such as acryl. The display light L reflected by the second reflector 30 is transmitted through the light transmitting cover 51 to be directed toward the windshield 3.

Herein, brief description of a mechanism in which the display device 1 displays the virtual image V is the following (1) and (2).

(1) When the display unit 10 displays an image, the display light L is emitted. The display light L from the display unit 10 is reflected by the first reflector 20 and the second reflector 30 in this order and is transmitted through the light transmitting cover 51 to be directed toward the windshield 3. In this way, the display device 1 emits the display light L toward the windshield 3.

(2) When the display light L from the display device 1 is reflected by the windshield 3, the virtual image V is displayed ahead of the windshield 3 seen from the user 4.

An electrical configuration of the display device 1 will be described with reference to FIG. 4.

The display device 1 is electrically connected to an ECU (Electronic Control Unit) 5 and an operation unit 6 of the vehicle 2 via a connector C by a wire harness.

The display device 1 includes a power supply circuit 60, a communication circuit 70, an image memory 80, the GDC 90, the control unit 100, and the drive unit 110.

The power supply circuit 60 includes a power supply IC (Integrated Circuit), a switching circuit including a transistor, and the like. The power supply circuit 60 is connected to a battery (not illustrated) of the vehicle 2 via the connector C and reduces a battery voltage to apply an appropriate drive voltage to each unit.

The communication circuit 70 is a circuit compatible with CAN (Controller Area Network) communication and supplies, to the control unit 100, signals received from the ECU 5 and the operation unit 6 via the connector C.

The image memory 80 includes a flash memory, an HDD (Hard Disk Drive), or the like and stores image data.

The GDC 90 is connected to the control unit 100 via an interface circuit (not illustrated) and performs bidirectional communication with the control unit 100. The GDC 90 controls operation of the display unit 10 in cooperation with the control unit 100 and displays, on the display unit 10, an image based on the image data stored in the image memory 80.

The control unit 100 is constituted of an IC such as a microcomputer and includes a CPU (Central Processing Unit) 101 and a control memory 102. The control memory 102 includes a ROM (Read Only Memory), a RAM (Random Access Memory), or the like. The CPU 101 reads out a program stored in advance in the control memory 102 and executes the program, thereby controlling operation of each unit of the display device 1. For example, when the CPU 101 acquires a signal indicating that an ignition of the vehicle 2 has been turned on from the ECU 5, the CPU 101 starts controlling each unit. Further, the CPU 101 acquires various kinds of information on the vehicle 2 transmitted from the ECU 5 and displays an image showing a vehicle speed, fuel consumption, and the like on the display unit 10.

The CPU 101 drives the stepping motor 41 via the drive unit 110 in response to a signal from the operation unit 6. The operation unit 6 includes an operation button, an operation key, a touchscreen, and the like and is provided at a predetermined position in the vehicle 2. The operation unit 6 supplies a signal (hereinafter, operation signal) indicating an operation content to the control unit 100 in response to ON or OFF operation from the user 4. When an operation signal indicating ON operation is supplied to the control unit 100, the control unit 100 outputs a drive signal for driving the stepping motor 41 to the drive unit 110. In this way, the rotor 410 of the stepping motor 41 successively moves from a current stable point to the next stable point adjacent thereto. With this, rotational power of the stepping motor 41 is transmitted to the lever part 33 via the gear mechanism 42, thereby rotating the second reflector 30. When the second reflector 30 rotates, a reflection angle at which the display light L is reflected is changed in accordance with this rotation. Therefore, a display position of the virtual image V moves in an upward direction or a downward direction seen from the user 4. In this way, the display position of the virtual image V can be adjusted. Meanwhile, when an operation signal indicating OFF operation is supplied to the control unit 100, the control unit 100 stops the rotor 410 at the nearest stable point. Thus, operation for adjusting the display position is terminated.

Waveform data obtained by quantizing a sine wave for each step is stored in advance in the ROM of the control memory 102. In the case where the CPU 101 drives the stepping motor 41 in response to, for example, acquisition of an operation signal from the operation unit 6, the CPU 101 reads out the waveform data in the ROM at two positions at which phases are shifted at 90° so as to correspond to the excitation coils 411a and 411b and supplies drive signals indicating respective drive waveforms to the drive unit 110. Further, in the ROM, an operation program of return-to-home processing described below is stored, and data indicating a "predetermined value", which is a threshold used when the drive unit 110 transmits a counter-electromotive signal, and a "predetermined number of times", which is a threshold indicating how many times a counter-electromotive signal is received to determine that the stepping motor 41 is in a stopped state, is stored in advance. Note that the control unit 100 includes a counter that counts the number of times at which a counter-electromotive signal is acquired from the drive unit 110.

The drive unit 110 includes a drive circuit for driving the stepping motor 41 with the microstep drive system under the control of the control unit 100. As shown in FIG. 4, the drive unit 110 includes a transistor bridge (not illustrated) connected to each of the excitation coils 411a (A phase) and 411b (B phase) and can adjust directions and magnitudes of excitation currents flowing through excitation coils 411. The drive unit 110 controls currents flowing through the excitation coils 411a and 411b of the stepping motor 41 in response to drive signals supplied from the control unit 100.

In the microstep drive method, the stepping motor 41 is driven at an angle obtained by dividing a step angle of the stepping motor 41 by a predetermined division number (the number of steps). The step angle is determined on the basis of the number of iron teeth of the stator (for example, 90°). In other words, the step angle is determined on the basis of a structure of the stepping motor 41. The rotor 410 of the stepping motor 41 can rotate more smoothly as the number of steps is increased.

Figure 5:
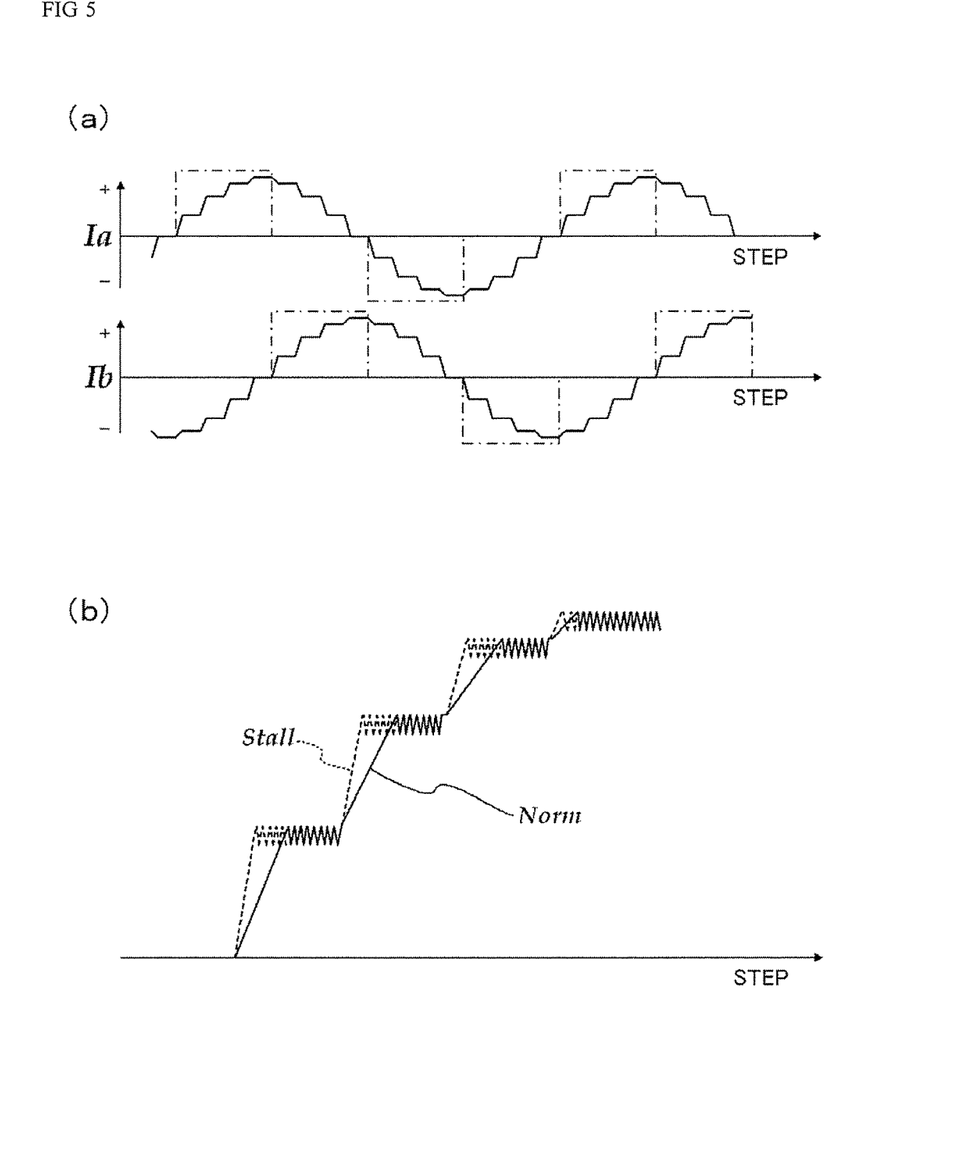

The drive unit 110 causes excitation currents Ia and Ib to flow through the excitation coils 411a and 411b in response to drive signals supplied from the control unit 100. Waveforms of the excitation currents Ia and Ib flowing through the excitation coils 411a and 411b are shown in FIG. 5(a). With this, the rotor 410 of the stepping motor 41 successively moves from a current stable point to an adjacent stable point while drive signals are being supplied from the control unit 100.

The drive unit 110 is constituted of a driver IC having a function of driving the stepping motor 41 as described above and a function of detecting counter-electromotive power generated in the stepping motor 41.

In the microstep drive, a current waveform having a sine wave shape is obtained by PWM (Pulse Width Modulation) drive, and therefore, when a part of the waveforms of the excitation currents in FIG. 5(a) is enlarged, a waveform corresponding to one step has a comb teeth shape (includes a plurality of PWM signals) as shown in FIG. 5(b). When the stepping motor 41 is stopped, counter-electromotive power is generated in the stepping motor 41 due to inductance of the excitation coils 411a and 411b. This causes a phenomenon in which the number of comb teeth (the number of PWM signals) corresponding to one step of the waveform of the current flowing through each of the excitation coils 411a and 411b is increased, as compared with the case where the rotor 410 of the stepping motor 41 rotates. In FIG. 5(b), a current waveform of the stepping motor 41 in an operating state is indicated by a solid line "Norm", and a current waveform thereof in a stopped state is indicated by a broken line "Stall".

The drive unit 110 in this embodiment detects counter-electromotive power by using this phenomenon.

Specifically, the control unit 100 drives the stepping motor 41 via the drive unit 110 to move the lever part 33 so that the lever part 33 abuts against the stopper unit 44. In this moving step, in the case where a difference between an output value (the number of PWM signals) of the stepping motor 41 acquired at a first timing and an output value (the number of PWM signals) of the stepping motor 41 acquired at a second timing is equal to or larger than a predetermined value set by the control unit 100, the drive unit 110 supplies a counter-electromotive signal indicating that counter-electromotive power has been detected to the control unit 100.

For example, in the case where the total number of PWM signals in a first quadrant period (an example of the first timing) of the drive waveform is compared with the total number of PWM signals in a third quadrant period (an example of the second timing) thereof and a difference between both the total numbers of PWM signals is equal to or larger than the predetermined value, the drive unit 110 supplies a counter-electromotive signal to the control unit 100. The predetermined value is set to be an appropriate value that prevents the drive unit 110 from erroneously detecting counter-electromotive power in the case where, for example, the stepping motor 41 is not stopped but engagement in the gear mechanism 42 is not favorable. Note that the drive unit 110 may detect counter-electromotive power from a drive current in the A phase or may detect counter-electromotive power from a drive current in the B phase. Further, counter-electromotive power may be detected from both the A phase and the B phase.

The display device 1 having the above configuration can perform normal operation such as driving the display unit 10 and adjusting the display position of the virtual image V (adjusting a rotation position of the second reflector 30) in response to operation performed with respect to the operation unit 6. However, the return-to-home processing peculiar to this embodiment will be described below.

In order to control the rotation position of the second reflector 30, it is necessary to perform the return-to-home operation for returning the stepping motor 41 to a mechanical reference position at the time of, for example, starting the display device 1 and then determine a home position. In this embodiment, the control unit 100 (CPU 101) executes the return-to-home processing, and therefore the home position can be determined without depending on a mechanical switch, as in the device disclosed in PTL 1 described above.

(Return-to-Home Processing)

Figure 6:
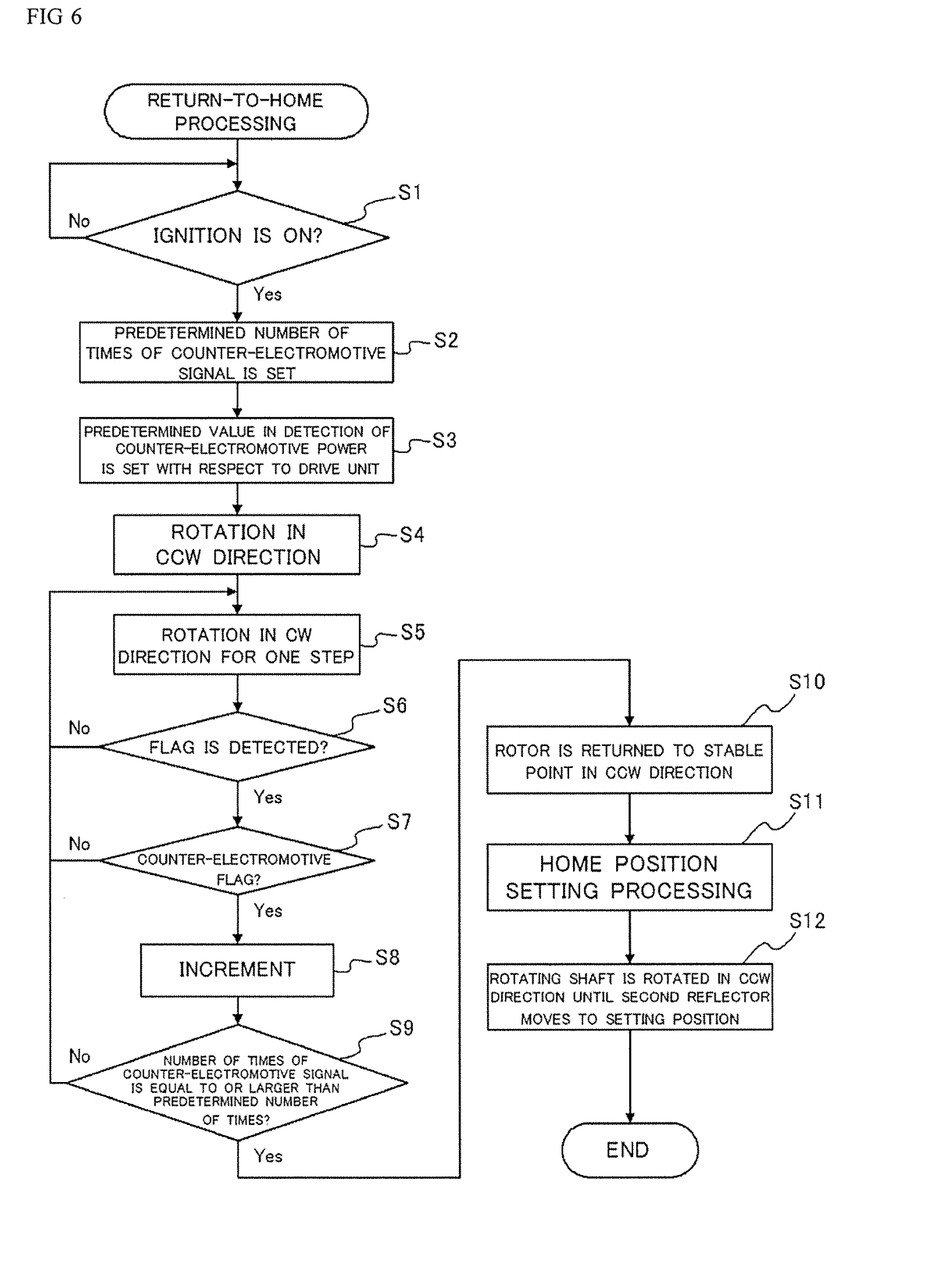
FIG. 6 is a flowchart of return-to-home processing executed by a control unit according to an embodiment of the invention.

The control unit 100 starts the return-to-home processing shown in a flowchart of FIG. 6 when, for example, a condition of supply of power to the display device 1 is satisfied.

When the control unit 100 acquires, from the ECU 5, a signal indicating that the ignition of the vehicle 2 has been turned on (Step S1; Yes), a predetermined number of times that is a start trigger for setting a home position is set (Step S2). The predetermined number of times is a threshold indicating how many times a counter-electromotive signal is acquired from the drive unit 110 to perform home position setting processing described below. The threshold is also set in the control unit 100 as described above, and therefore it is possible to favorably prevent the control unit 100 from erroneously detecting stop of the stepping motor 41. Note that the control unit 100 waits until the signal indicating that the ignition has been turned on is acquired (Step S1; No).

Then, the control unit 100 sets, with respect to the drive unit 110, a predetermined value serving as a threshold for determining that the drive unit 110 detects counter-electromotive power of the stepping motor 41 (Step S3).

Then, the control unit 100 supplies a drive signal to the drive unit 110 and rotates the rotating shaft 41a of the stepping motor 41 in the CCW direction at an angle determined in advance (Step S4). With this, the lever part 33 of the second reflector 30 moves in the direction in which the lever part 33 moves away from the stopper unit 44. Note that a rotation angle in this processing is defined to have an amount enough to accurately set a home position (for example, an electric angle of 360° or more).

Then, the control unit 100 rotates the rotating shaft 41a of the stepping motor 41 for one step in the CW direction (Step S5), thereby causing the lever part 33 to approach the stopper unit 44 for a predetermined amount. Thereafter, the control unit 100 determines whether or not a flag set in advance has been detected (Step S6). A plurality of flags are set, and, in the case where at least one flag thereamong is detected (Step S6; Yes), the control unit 100 determines whether or not the detected flag is a counter-electromotive flag (Step S7). The counter-electromotive flag is set in advance so as to be formed when a counter-electromotive signal is acquired from the drive unit 110.

In the case where the flag cannot be detected (Step S6; No) or the detected flag is not the counter-electromotive flag (Step S7; No), the control unit 100 returns processing to Step S5.

Meanwhile, in the case where the counter-electromotive flag is detected (Step S7; Yes), the control unit 100 increments a counting value indicating how many times the electromotive signal has been acquired from the drive unit 110 by using the counter (Step S8). Then, the control unit 100 determines whether or not the counting value of the counter is equal to or larger than the predetermined number of times set in Step S2 (Step S9). When the counting value is less than the predetermined number of times (Step S9; No), the processing from Step S5 to Step S8 is repeatedly executed until the counting value reaches the predetermined number of times.

In the process of repeating the processing from Step S5 to Step S8 as described above, the lever part 33 is brought into contact with the stopper unit 44. Before and after the lever part 33 is brought into contact with the stopper unit 44, an output value (the number of PWM signals) of the stepping motor 41 is changed as shown in FIG. 5(b). Therefore, a counter-electromotive signal is supplied to the control unit 100 from the drive unit 110 in this process, and the control unit 100 increments a counting value every time when the control unit 100 acquires a counter-electromotive signal (Step S8).

In the case where the counting value is equal to or larger than the predetermined number of times (Step S9; Yes), the control unit 100 rotates the rotating shaft 41a (rotor 410) of the stepping motor 41 in the CCW direction to return the rotor 410 to the nearest stable point (Step S10). In other words, the rotor 410 is positioned to the nearest stable point from a position at which the lever part 33 is assumed to have been brought into contact with the stopper unit 44. Thus, the stepping motor 41 returns to a home position. Then, the control unit 100 executes the home position setting processing for storing a current position in the control memory 102 (Step S11).

After the home position is set, the control unit 100 rotates the rotating shaft 41a of the stepping motor 41 in the CCW direction and moves the second reflector 30 to a position set in advance as a default position or a position set by the user 4's operation (Step S12), and the processing is terminated.

Thereafter, operation for adjusting a rotation angle of the second reflector 30, i.e., operation for adjusting the display position of the virtual image V can be performed by the user 4 until the display device 1 is turned off by, for example, turning off the ignition.

The display device 1 can determine a home position by executing the above return-to-home processing, and therefore the mechanical switch is unnecessary. This makes it possible to reduce costs for the mechanical switch and simplify a system.

Hereinabove, there has been described an example where the stopper unit 44 is provided in the container 43 made of resin and a moving part that rotationally moves together with the second reflector 30 to be brought into contact with the stopper unit 44 is the lever part 33, but those members can be variously changed. Hereinafter, a modification example will be described. Note that, in order to easily understand the following description, members having functions similar to those of the members in the above embodiment are denoted by reference symbols same as the reference symbols in the above embodiment, and a difference will be mainly described.

Modification Example 1

Figure 7:
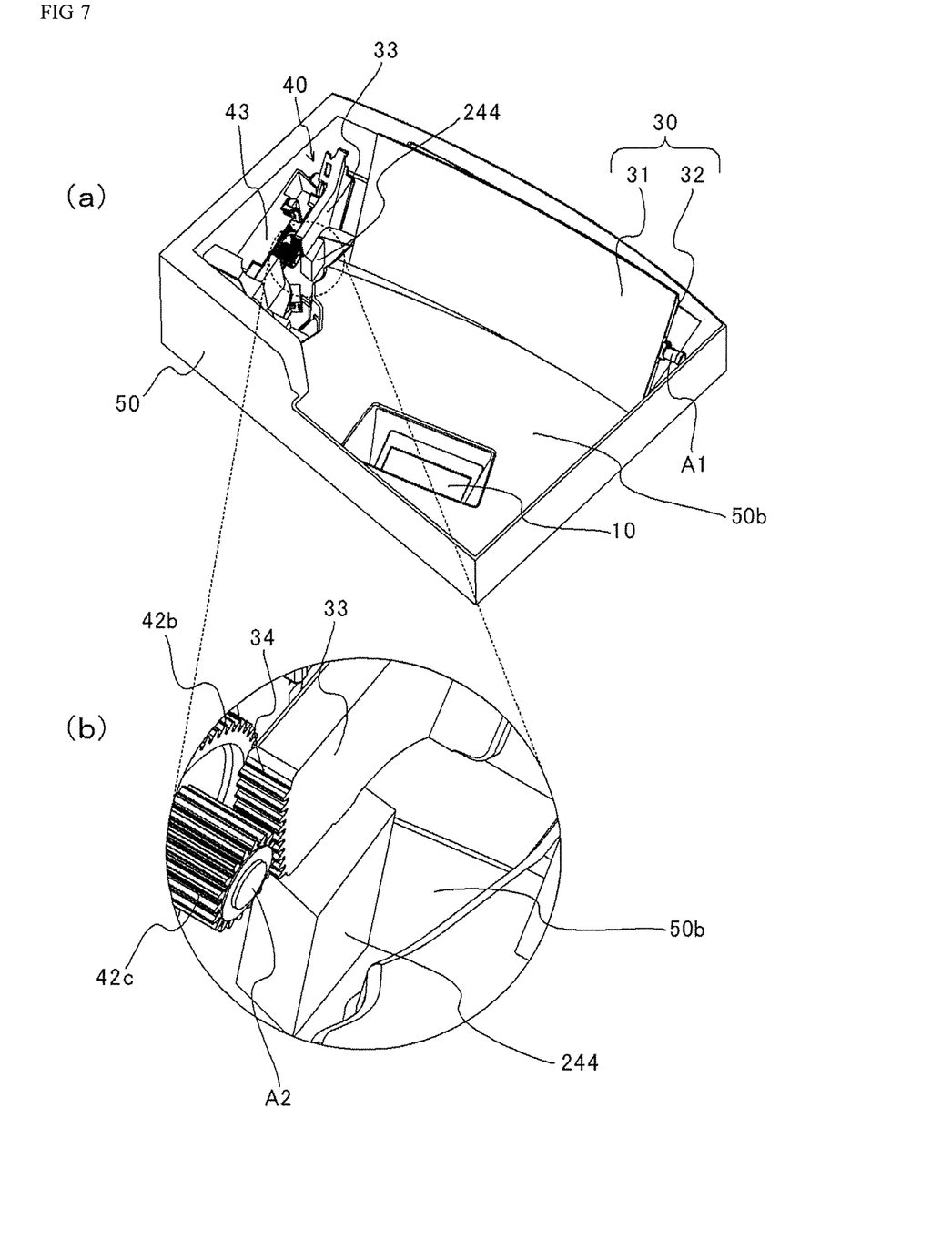

A stopper unit 244 in Modification Example 1 illustrated in FIGS. 7(a) and 7(b) is provided in the housing 50 made of metal instead of the container 43. Specifically, the stopper unit 244 is projected upward from a bottom part 50b of the housing 50 having a box shape. The stopper unit 244 is integrally formed with the housing 50. The stopper unit 244 is also provided within a range of rotational movement of the lever part 33, and, when the control unit 100 rotates the rotating shaft 41a of the stepping motor 41 in the CW direction, the lever part 33 abuts against the stopper unit 244. The return-to-home processing may be performed by forming the display device as described above.

With this configuration, the stopper unit 244 to be brought into contact with the lever part 33 can be firmly formed to be resistant to thermal deformation and the like, and therefore improvement in detection accuracy of a home position can be expected.

Modification Example 2

Figure 8:
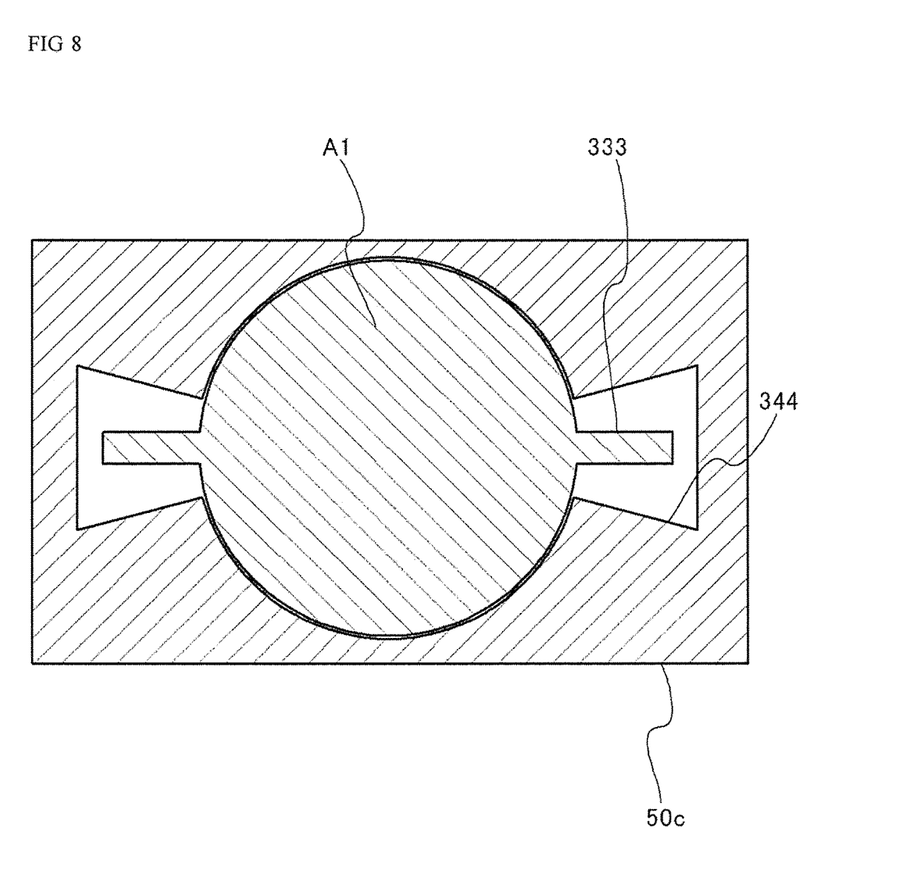
FIG. 8 is an explanatory view of a moving part and a stopper unit according to Modification Example 2.

In Modification Example 2, as illustrated in FIG. 8, projection parts 333, each of which is to be brought into contact with a stopper unit 344 at a predetermined position, are provided to the rotating shaft A1 of the second reflector 30. Specifically, the projection part 333 is projected in a direction of an outer diameter of the rotating shaft A1 made of metal or the like. The stopper unit 344 is formed to have a cut-out shape in a bearing 50c for supporting the rotating shaft A1 formed in the housing 50 (or formed in a predetermined member immovable with respect to the housing 50). The return-to-home processing may be performed by forming the display device as described above.

With this configuration, the stopper unit 344 can abut against the projection part 333 at a portion at which a power transmission member such as the gear mechanism 42 is not interposed, and therefore it is possible to suppress unexpected movement of the concave mirror 31 caused by stress strain.

Note that the invention is not limited to the above embodiment and modification examples. It is possible to appropriately change the configuration within the scope of the invention (including deletion of constituent elements). Hereinafter, modification examples will be described.

Hereinabove, there has been described an example where, in the return-to-home processing, processing proceeds to Step S2 at a timing at which the control unit 100 acquires a signal indicating that the ignition has been turned on, but a timing is not limited thereto. For example, the return-to-home processing may be performed at a timing at which the user 4 performs start operation of the display device 1.

Hereinabove, there has been described an example where the drive unit 110 compares the total number of PWM signals in the first quadrant period (an example of the first timing) of the drive waveform with the total number of PWM signals in the third quadrant period (an example of the second timing) thereof, but this invention is not limited thereto. For example, it is possible to perform various modifications such as comparison between periods for an electric angle of 45° in the drive waveform.

Hereinabove, there has been described an example where the driver IC also has the function of detecting counter-electromotive power of the stepping motor 41, but a circuit for detecting counter-electromotive power may be provided separately from the driver IC.

Hereinabove, there has been described an example where the stepping motor 41 is a PM type stepping motor, but this invention is not limited thereto. The stepping motor 41 may be an HB type (HyBrid type) stepping motor, a linear stepping motor, or the like. Further, the stepping motor 41 is not limited to a 2-phase stepping motor, and the phase of the stepping motor 41 may be 3 or more.

Hereinabove, the concave mirror 31 is an example of the reflector moved by power of the stepping motor 41, but the reflector is not limited thereto. The reflector moved by power of the stepping motor 41 may be a plane mirror.

Hereinabove, there has been described an example where the concave mirror 31 that is an example of the reflector is rotationally moved about the rotating shaft A1 above, but this invention is not limited thereto. The reflector may be slidably moved (including parallel movement) on the basis of rotational drive of the stepping motor 41. In other words, the reflector only needs to be moved in accordance with rotation of the rotor 410 of the stepping motor 41 and may be rotationally moved or slidably moved.

The display device 1 may be configured to adjust the virtual image V in a horizontal direction seen from the user 4 or may be configured to adjust the virtual image V in both a vertical direction and the horizontal direction.

Hereinabove, there has been described an example where the display light L is reflected by the windshield 3 of the vehicle 2 to cause the user 4 to visually recognize a display image, but this invention is not limited thereto. The display device may include a dedicated combiner and may cause the display light L to be reflected by the combiner to thereby cause a display image to be visually recognized. In this case, the combiner can also be configured to rotate in accordance with operation of the stepping motor 41 to thereby change a reflection angle of the display light L in the combiner so as to adjust a display position. In other words, the combiner that is an example of a light transmitting member and also functions as an example of a reflector may be included in the display device.

The display unit 10 may include another publicly known display such as an organic EL (Electro-Luminescence) display.

In the above embodiment, a vehicle is an example of a conveyance on which the display device 1 is mounted, but this invention is not limited thereto. The display device 1 may be mounted on another vehicle such as a motorcycle, a construction machine, a farm machine, a ship, an airplane or the like.

INDUSTRIAL APPLICABILITY

The invention is suitable as an in-vehicle display device and is also applicable to a display device that is mounted on another moving body and includes a movable part capable of adjusting a display position.

REFERENCE SIGNS LIST

1 display device
2 vehicle
3 windshield (example of light transmitting member)
4 user
5 ECU
6 operation unit
10 display
20 first reflector
21 cold mirror
30 second reflector
31 concave mirror (example of reflector)
32 holding member
33 lever part (example of moving part)
333 projection part (example of moving part)
34 gear part
40 rotary drive mechanism
41 stepping motor
410 rotor
411*a*, 411*b* excitation coil
42 gear mechanism
43 container
44, 244, 344 stopper unit
50 housing
100 control unit (example of control means)
101 CPU
102 control memory
110 drive unit (example of drive means)
L display light
V virtual image

The invention claimed is:

1. A display device for projecting display light emitted from a display unit onto a light transmitting member to display a virtual image of an image formed by the display light, comprising:
   a stepping motor;
   a reflector for reflecting the display light emitted by the display unit toward the light transmitting member, the reflector moving in accordance with operation of the stepping motor;
   a moving part moving together with the reflector;
   drive means for driving the stepping motor with a microstep drive system;
   control means for controlling the drive means to control movement of the reflector; and a stopper unit provided within a range of movement of the moving part, wherein:

the drive means has a function of detecting counter-electromotive power that is generated in the stepping motor when the moving part abuts against the stopper unit; and when the drive means detects the counter-electromotive power, the control means determines a reference position for controlling movement of the reflector.

2. The display device according to claim 1, wherein:

when the drive means detects the counter-electromotive power, the drive means supplies, to the control means, a counter-electromotive signal indicating that the counter-electromotive power has been detected; and the control means determines the reference position in the case where the counter-electromotive signal is acquired a predetermined number of times.

3. The display device according to claim 1, wherein the drive means detects the counter-electromotive power in the case where the control means moves the moving part and then a difference between an output value of the stepping motor acquired at a first timing and an output value of the stepping motor acquired at a second timing is equal to or larger than a predetermined value.

4. The display device according to claim 1, wherein the control means determines the reference position by moving the moving part in a direction in which the moving part moves away from the stopper unit and then moving the moving part in a direction in which the moving part approaches the stopper unit.

5. The display device according to claim 1, comprising a housing receiving the display unit, the reflector, and the moving part, wherein:

the reflector is rotationally movable about a predetermined shaft;

the moving part is projected from the reflector in an outer circumferential direction of the shaft; and the stopper unit is immovable with respect to the housing and is made of resin.

6. The display device according to claim 1, comprising a housing receiving the display unit, the reflector, and the moving part and made of metal, wherein the stopper unit is integrally formed with the housing.

7. The display device according to claim 1, comprising a housing receiving the display unit, the reflector, and the moving part, wherein:

the reflector is rotationally movable about a predetermined shaft;

the moving part is provided to the shaft and is projected in an outer circumferential direction of the shaft; and the stopper unit is provided in a bearing part supporting the shaft and immovable with respect to the housing.

* * * * *